United States Patent [19]

Yasui

[11] Patent Number: 5,338,604
[45] Date of Patent: Aug. 16, 1994

[54] FISHING ROD STOCK AND METHOD OF MANUFACTURING SAME

[75] Inventor: Toshihiko Yasui, Tondabayashi, Japan

[73] Assignee: Shimano Inc., Osaka, Japan

[21] Appl. No.: 989,818

[22] Filed: Dec. 14, 1992

[30] Foreign Application Priority Data

Dec. 18, 1991 [JP] Japan .................. 3-333776

[51] Int. Cl.$^5$ .............................................. B32B 9/00
[52] U.S. Cl. .................. 428/36.3; 428/36.2; 428/107; 428/113; 428/213; 428/284; 428/292; 428/294; 428/302; 428/392; 428/902
[58] Field of Search ............ 428/36.2, 113, 213, 428/107, 392, 284, 302, 902; 273/80 R; 43/18.5

[56] References Cited

U.S. PATENT DOCUMENTS

| | | | |
|---|---|---|---|
| 4,043,074 | 8/1977 | Airhart | 428/367 |
| 4,061,806 | 12/1977 | Lindler et al. | 428/213 |
| 4,157,181 | 6/1979 | Cecka | 428/377 |
| 4,309,473 | 1/1982 | Minamisawa et al. | 428/294 |
| 4,759,147 | 7/1988 | Pirazzini | 428/113 |
| 4,885,865 | 12/1989 | Rumbaugh | 43/18.5 |
| 5,048,441 | 9/1991 | Quigley | 428/113 |

FOREIGN PATENT DOCUMENTS 62-292422 12/1987 Japan .

Primary Examiner—Patrick J. Ryan
Assistant Examiner—Abraham Bahta
Attorney, Agent, or Firm—Dickstein, Shapiro & Morin

[57] ABSTRACT

Fishing rod stock is manufactured by winding three prepreg sheets around a mandrel to form three resin layers including high strength fibers. The first resin layer is formed over an entire axial length of the fishing rod stock. The second resin layer is formed on a rearward portion of the fishing rod stock. The third resin layer is smaller than the second resin layer and formed on a rearward region of the fishing rod stock. The high strength fiber of the second resin layer has a higher modulus of elasticity than the high strength fiber of the first resin layer. The high strength fiber of the third resin layer has a higher modulus of elasticity than the high strength fiber of the second resin layer. The high strength fibers of the second and third resin layers progressively increase in quantity toward a rear end of the fishing rod stock.

10 Claims, 4 Drawing Sheets

FISHING ROD STOCK AND METHOD OF MANUFACTURING SAME

BACKGROUND OF THE INVENTION

1. Field of the Invention

The present invention relates to fishing rod stock and a method of manufacturing the rod stock. More particularly, the invention relates to a method of manufacturing tubular rod stock by winding, around a gently tapered mandrel, prepreg formed of high strength fiber impregnated with a thermosetting resin, and allowing the resin to harden. Specifically, the invention relates to a technique of determining condition of fishing rods.

2. Description of the Related Art

A conventional technique of determining condition of fishing rods is disclosed in Japanese Patent Publication Kokai No. 62-292422, for example. According to the conventional technique, a mandrel having a sharply tapered intermediate portion is used in manufacturing fishing rod stock. Completed fishing rod stock has varied bending strengths based on a difference in diameter between a tip end portion and a butt end portion thereof.

Where, as in the prior art, the mandrel used includes a sharply tapered intermediate portion, a desired condition of fishing rods is achieved relatively reliably. However, a single sheet of prepreg may be creased in a region corresponding to the intermediate portion of the mandrel. It is difficult to apply a suitable pressure uniformly over the prepreg being wound. The prior art method has room for improvement with respect to manufacturing efficiency.

On the other hand, a fishing rod used for catching relatively large fish should be flexed in arcuate form with a bending force distributed throughout the rod when drawing a fish. This allows the angler to draw and land a fish with ease by using elasticity of the rod. However, a fishing rod formed of the rod stock having varied diameters as noted above includes an intermediate position presenting a change in the modulus of elasticity (or a change in the modulus of section) of the rod. This results in local bending of the fishing rod, making it difficult to flex the entire rod in a large arcuate form.

Fishing rod stock may be manufactured easily by winding prepreg around a gently tapered mandrel. However, a rear end region of this fishing rod stock has insufficient flexural rigidity compared with a tip end region thereof. A fishing rod formed of prepreg having a uniform modulus of elasticity has the inconvenience of tending to bend greatly in a rear end region thereof. There is room for improvement in this respect also.

SUMMARY OF THE INVENTION

An object of the present invention is to provide fishing rod stock flexible in a large arcuate form to distribute a bending force throughout, and an improved method of manufacturing fishing rod stock which realizes a desired condition of fishing rods in a simple operation.

The above object is fulfilled, according to the present invention, by fishing rod stock comprising a first resin layer including high strength fiber and formed over an entire axial length of the fishing rod stock, and a second resin layer including high strength fiber having a higher modulus of elasticity than the high strength fiber of the first resin layer, and formed on a rearward portion of the fishing rod stock less than the entire length thereof, the high strength fiber of the second resin layer progressively increasing in quantity toward a rear end of the fishing rod stock.

This fishing rod stock has the following functions and effects.

The above features may be arranged as shown in FIGS. 1 through 4, for example. The rod stock R includes a tip end portion having only a first resin layer 1 formed thereon. A rear portion of the rod stock R has also a second resin layer 2 with high strength fiber S2 progressively increasing in quantity toward a rear end of the rod stock R. Thus, curvature of the rod stock R occurring under a bending force is the smaller toward the rear end thereof. In addition, this rod stock R is free from marked local bending.

The rod stock R according to the present invention is not formed of a high strength fiber having a fixed characteristic, but is formed of at least two types of high strength fibers S1 and S2 having different moduli of elasticity. Moreover, the high strength fibers are distributed in predetermined quantities to realize a fishing rod flexible in a large arcuate form in an actual fishing situation, to distribute a bending force throughout the rod.

It should be noted that these drawings do not depict the variation in the quantity of high strength fiber S2 in the second resin layer 2.

In a further aspect of the invention, a method of manufacturing fishing rod stock is provided which comprises the steps of winding around a mandrel a first prepreg sheet including a high strength fiber impregnated with a thermosetting resin, and a second prepreg sheet including a high strength fiber having a higher modulus of elasticity than the high strength fiber of the first prepreg sheet and impregnated with the thermosetting resin, with ends of the respective prepreg sheets placed at a large diameter position of the mandrel, the second prepreg sheet having a smaller size axially of the mandrel than the first prepreg sheet, and the other end thereof opposed to a small diameter end of the mandrel lying at an angle to an axis of the mandrel; and baking the first and second prepreg sheets to allow the sheets to harden into a tubular stock shape.

This method has the following functions and effects.

The above features may be arranged as shown in FIGS. 5 and 6, for example. At least two types of prepreg sheets P1 and P2 are used. The first prepreg sheet P1 (first resin layer 1), after baking, forms a tip end portion (small diameter portion) of rod stock R, with high strength fiber S1 having a strength resistive to a bending force as in the prior art. A rearward portion (large diameter portion) of the rod stock R has the first prepreg sheet P1 and second prepreg sheet P2 (second resin layer 2) with the high strength fibers S1 and S2 presenting a stronger resistance to a bending force than in the prior art. In addition, since the high strength fiber S2 of the second resin layer 2 progressively increases in quantity toward the rear end, the resistance to a bending force is the stronger toward the rear end.

That is, the present invention uses a mandrel having an approximately straight shape as often used heretofore, for winding the first prepreg sheet P1. Then, the second prepreg sheet P2 having a predetermined shape is wound around the first prepreg sheet P1 (though the second prepreg sheet P2 may be placed under the first prepreg sheet P1). This realizes fishing rod stock R having a desired condition, with a modulus of elasticity progressively increasing toward the rear end.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Figure 1:
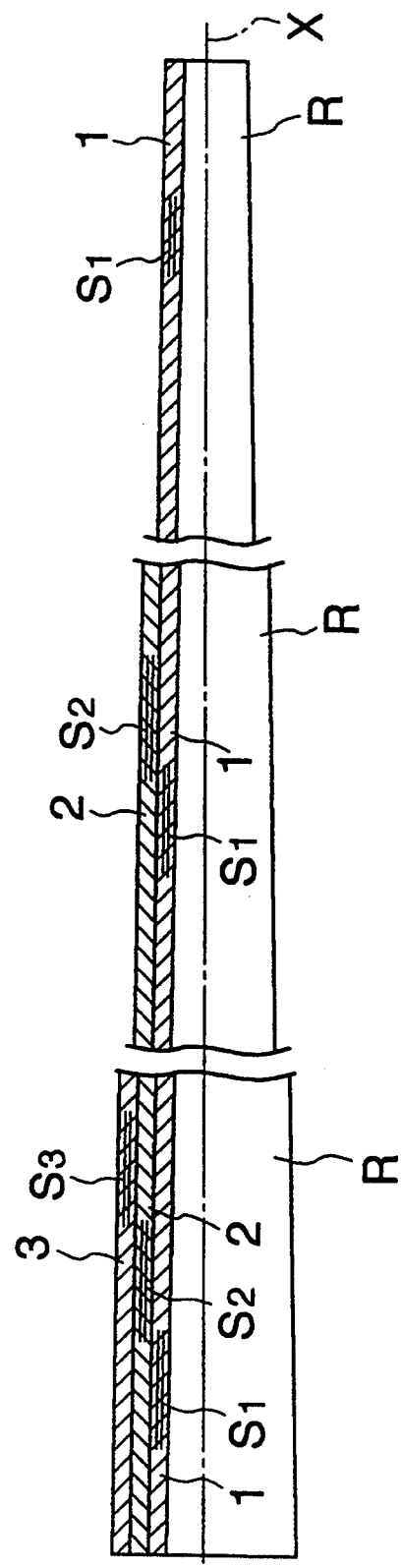
FIG. 1 is a side view, partly in section, of fishing rod stock according to the present invention.
Figure 2:
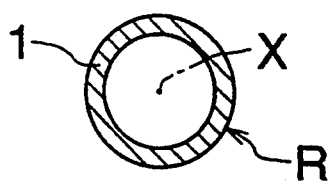
FIG. 2 is a sectional view of a tip end portion of the rod stock.
Figure 3:
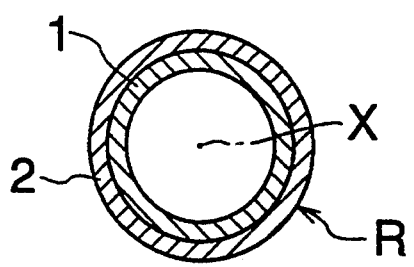
FIG. 3 is a sectional view of an intermediate portion of the rod stock.
Figure 4:
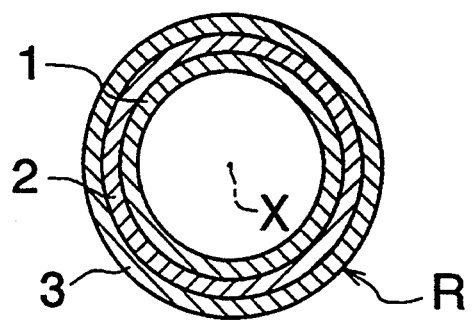
FIG. 4 is a sectional view of a rear end portion of the rod stock.

Fishing rod stock and a method of manufacturing the rod stock according to the present invention will be described in detail hereinafter with reference to the drawings.

Fishing rod stock R has a construction as shown in FIGS. 1 through 4.

The rod stock R includes a first resin layer 1 formed over an entire length along an axis X thereof, a second resin layer 2 formed on a rearward portion shorter than the entire length of the rod stock R, and a third resin layer 3 formed on a rearward portion smaller than the second resin layer 2.

The first, second and third resin layers include high strength, carbon fibers. The high strength fiber S2 of the second resin layer 2 has a higher modulus of elasticity than the high strength fiber S1 of the first resin layer 1. The high strength fiber S3 of the third resin layer 3 has a higher modulus of elasticity than the high strength fiber S2 of the second resin layer 2. The second and third resin layers 2 and 3 have the high strength fibers S2 and S3 in quantities, as seen circumferentially, progressively increasing toward rear ends thereof (i.e. the resin layers 2 and 3 being formed progressively thicker toward the rear ends). A fishing rod formed of this rod stock R, when drawing a fish, is flexible in a large arcuate form to distribute a bending force throughout an entire length thereof.

Although the drawings depict the respective resin layers 1, 2 and 3 to be discrete, the rod stock R is in fact an integral body having the resin layers 1, 2 and 3 rigidly fused together. The high strength fiber S1 of the first resin layer 1 has a modulus of elasticity set to 24 tons/mm$^2$. The high strength fiber S2 of the second resin layer 2 has a modulus of elasticity set to 30 tons/mm$^2$. The high strength fiber S3 of the third resin layer 3 has a modulus of elasticity set to 40 tons/mm$^2$.

The rod stock R is manufactured in the following sequence.

Figure 5:
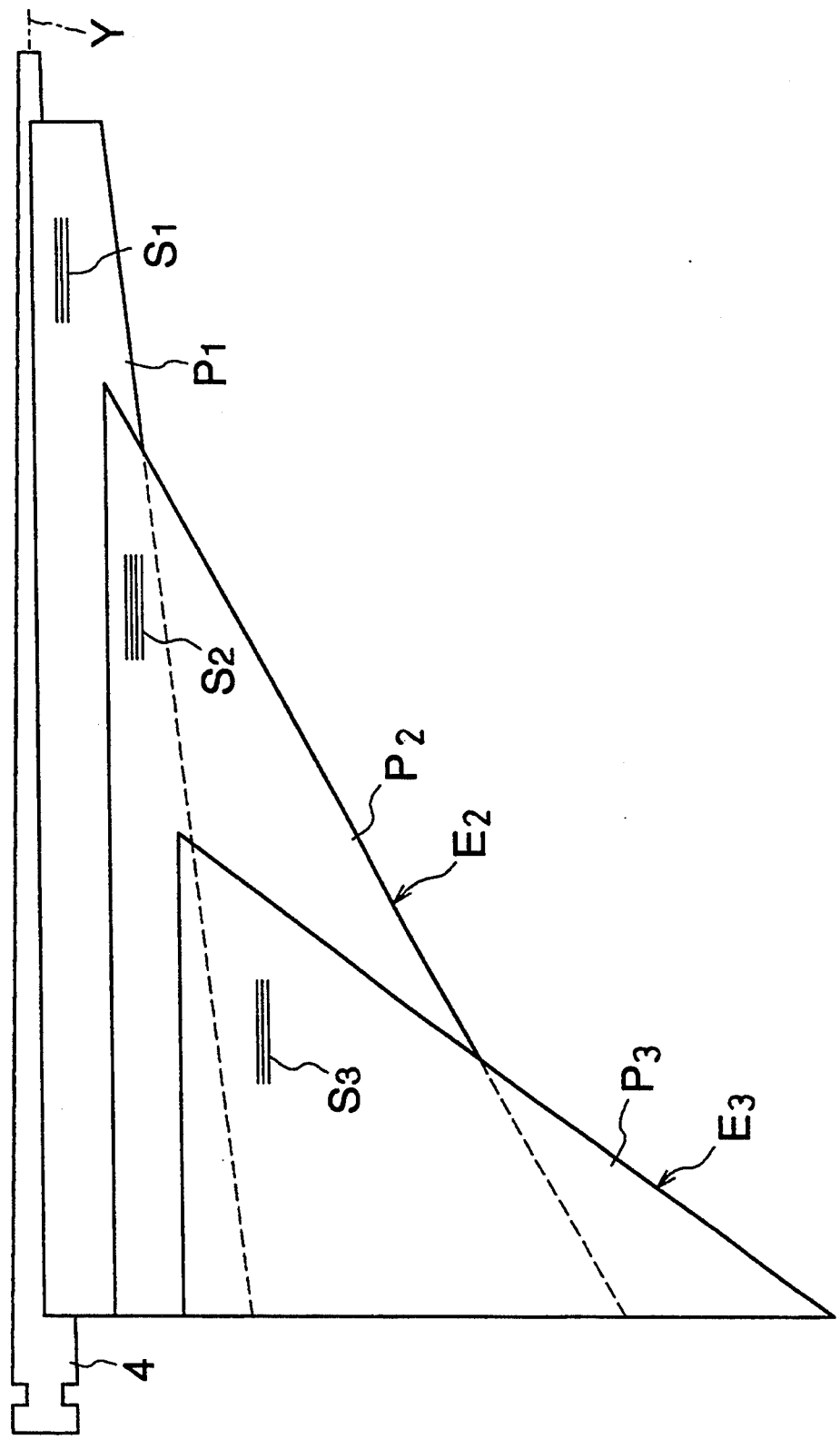
FIG. 5 is a side view showing prepreg sheets wound on a mandrel.

As shown in FIG. 5, a first prepreg sheet P1 is wound around a gently tapered mandrel 4 first. This prepreg sheet P1 forms the first resin layer 1 after baking.

Next, a second prepreg sheet P2, which forms the second resin layer 2 after baking, is wound around a large diameter portion (rearward portion) of the first prepreg sheet P1. In winding the second prepreg sheet P2, a position (tip end portion) E2 thereof opposed to a tip end portion or small diameter portion of the mandrel 4 is placed at an angle to an axis Y of the mandrel 4.

Next, a third prepreg sheet P3, which forms the third resin layer 3 after baking, is wound around a large diameter portion (rearward portion) of the second prepreg sheet P2. In winding the third prepreg sheet P3, a position (tip end portion) E3 thereof opposed to the tip end portion or small diameter portion of the mandrel 4 is placed at an angle relative to the axis Y of the mandrel 4.

Figure 6:
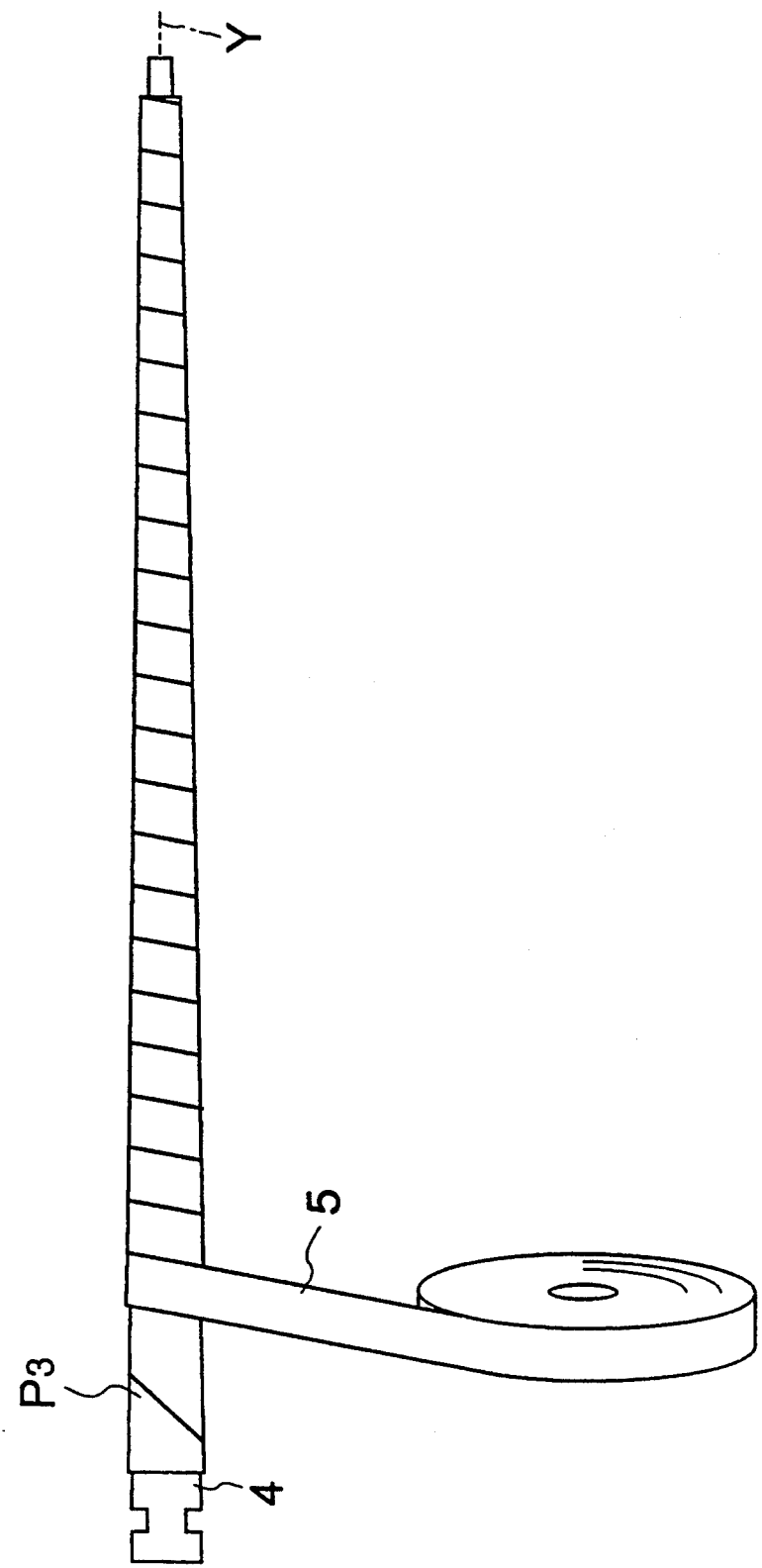
FIG. 6 is a side view showing an operation to wind heat contractible tape.

The high strength fibers S1, S2 and S3 of the prepreg sheets P1, P2 and P3 are paralleled carbon fibers impregnated with an epoxy resin. The edges E2 and E3 of the second and third prepreg sheets P2 and P3 are inclined so that, after baking, the high strength fibers S2 and S3 are in quantities, as seen circumferentially of the rod stock R, progressively increasing toward the rear end. After the above sheet winding steps, a heat contractible tape 5 is wound as shown in FIG. 6. Then, the product is baked at a predetermined temperature, whereby the prepreg sheets P1, P2 and P3 are fused together to form a tubular object. Subsequently, the mandrel 4 is removed, and opposite ends of the tubular object are cut, and a predetermined surface treatment is carried out to complete the fishing rod stock.

The present invention may be modified as follows:

(a) Two, three or more resin layers may be formed. The second resin layer may be formed under the first resin layer.

Where three or more resin layers are formed, a resin layer may be formed under the first resin layer or over the second resin layer, or between the first resin layer and second resin layer.

(b) In manufacturing the rod stock, the first resin layer may be wound around an outer surface of the second resin layer.

(c) Two, three or more types of prepreg having different moduli of elasticity may be used.

(d) The prepreg sheets may be wound around the mandrel independently of each other.

(e) The thickness of prepreg may be adjusted to increase the high strength fiber of the second resin layer toward the rear end. Alternatively, the density of the high strength fiber in the prepreg may be adjusted for this purpose.

(f) Glass fiber may be used for the first resin layer, while carbon fiber is used as high strength fiber for the second resin layer.

(g) Boron fiber may be used as high strength fiber for the second resin layer, while carbon fiber is used for the first resin layer.

What is claimed is:

1. Fishing rod stock comprising:

a first resin layer including a first reinforcing fiber and formed over an entire axial length of the fishing rod stock; and a second resin layer including a second reinforcing fiber having a higher modulus of elasticity than the first reinforcing fiber of said first resin layer, and wound on a rearward portion of said fishing rod stock shorter than the entire length thereof, the second reinforcing fiber of said second resin layer progressively increasing in winding quantity toward a rear end of said fishing rod stock;

wherein only said first resin layer is formed at a tip end portion of the rod stock, whereas, at said rearward portion of the rod stock, said second resin layer is wound with progressively increasing winding quantity toward the rear end of the rod stock, such that the rod stock when flexed is free from marked local bending and also bends in an arcuate form toward said rear end thereof so as to distribute a bending force throughout the rod stock.

2. Fishing rod stock as defined in claim 1, wherein said second resin layer is formed on an outer surface of said first resin layer.

3. Fishing rod stock as defined in claim 1, further comprising a third resin layer including a third reinforcing fiber having a higher modulus of elasticity than the second reinforcing fiber of said second resin layer, and formed on a rearward region of said fishing rod stock smaller than said second resin layer.

4. Fishing rod stock as defined in claim 3, wherein the first reinforcing fiber of said first resin layer has a modulus of elasticity of about 24 tons/mm$^2$, the second reinforcing fiber of said second resin layer has a modulus of elasticity of 30 tons/mm$^2$, and the third reinforcing fiber of said third resin layer has a modulus of elasticity of about 40 tons/mm$^2$.

5. Fishing rod stock as defined in claim 3, wherein carbon fiber is used as the reinforcing fibers of said first resin layer, said second resin layer and said third resin layer.

6. Fishing rod stock as defined in claim 3, wherein glass fiber is used as the first reinforcing fiber of said first resin layer, and carbon fiber is used as the reinforcing fibers of said second resin layer and said third resin layer.

7. Fishing rod stock as defined in claim 3, wherein carbon fiber is used as the reinforcing fibers of said first resin layer and said second resin layer, and boron fiber is used as the third reinforcing fiber of said third resin layer.

8. Fishing rod stock as defined in claim 1, comprising at least three resin layers including an intermediate resin layer formed between said first resin layer and said second resin layer, said intermediate resin layer including a reinforcing fiber having a lower modulus of elasticity than the second reinforcing fiber of said second resin layer.

9. Fishing rod stock as defined in claim 8, wherein the first reinforcing fiber of said first resin layer has a modulus of elasticity of about 24 tons/mm$^2$, the reinforcing fiber of said intermediate resin layer has a modulus of elasticity of about 24 tons/mm$^2$, and the second reinforcing fiber of said second resin layer has a modulus of elasticity set to about 30 tons/mm$^2$.

10. A fishing rod stock comprising:
a first resin layer including a first carbon fiber and formed over an entire axial length of the fishing rod stock, said carbon fiber having a modulus of elasticity of approximately 24 tons/mm$^2$;
a second resin layer including a second carbon fiber having a modulus of elasticity of approximately 30 tons/mm$^2$, and wound on said first resin layer on a rearward portion of the fishing rod stock shorter than said entire axial length, said second carbon fiber of said second resin layer progressively increasing in winding quantity toward a rear end of said fishing rod stock; and
a third resin layer including a third carbon fiber having a modulus of elasticity of approximately 40 tons/mm$^2$, and wound on said second resin layer on a rearward portion thereof shorter than an entire length thereof, said third carbon fiber of said third resin layer progressively increasing in winding quantity toward the rear end of said fishing rod stock;
wherein only said first resin layer is formed at a tip end portion of the rod stock, whereas, at said rearward portion of the rod stock, said second resin layer is wound with progressively increasing winding quantity toward the rear end of the rod stock, such that the rod stock is free from marked local bending and bends in an arcuate form toward said rear end thereof so as to distribute a bending force throughout the rod stock.

* * * * *